US012616223B2

(12) United States Patent
Osanai

(10) Patent No.: US 12,616,223 B2
(45) Date of Patent: May 5, 2026

(54) SOLID COMPOSITION HAVING FLORAL SCENT

(71) Applicant: SUNTORY HOLDINGS LIMITED, Osaka (JP)

(72) Inventor: Taisuke Osanai, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 267 days.

(21) Appl. No.: 18/284,136

(22) PCT Filed: Mar. 9, 2022

(86) PCT No.: PCT/JP2022/010275
§ 371 (c)(1),
(2) Date: Sep. 26, 2023

(87) PCT Pub. No.: WO2022/209660
PCT Pub. Date: Oct. 6, 2022

(65) Prior Publication Data
US 2024/0298663 A1 Sep. 12, 2024

(30) Foreign Application Priority Data

Mar. 31, 2021 (JP) ................................ 2021-060555

(51) Int. Cl.
| | |
|---|---|
| *A23F 3/30* | (2006.01) |
| *A23F 3/40* | (2006.01) |
| *A23L 27/10* | (2016.01) |

(52) U.S. Cl.
CPC .................. *A23F 3/30* (2013.01); *A23F 3/40* (2013.01); *A23L 27/10* (2016.08)

(58) Field of Classification Search
CPC ............... A23F 3/30; A23F 3/40; A23L 27/10
See application file for complete search history.

(56) References Cited

U.S. PATENT DOCUMENTS

| | | | |
|---|---|---|---|
| 2010/0209585 A1 | 8/2010 | Fukuda et al. | |
| 2022/0183314 A1 | 6/2022 | Yonezawa et al. | |

FOREIGN PATENT DOCUMENTS

| | | | |
|---|---|---|---|
| EP | 2281463 | A1 | 2/2011 |
| JP | 2004-159505 | A | 6/2004 |
| JP | 2007-289115 | A | 11/2007 |
| JP | 2009-72188 | A | 4/2009 |
| JP | 2010-233559 | A | 10/2010 |
| JP | 2013-153739 | A | 8/2013 |
| JP | 2013-226111 | A | 11/2013 |
| WO | 2019/154554 | A1 | 8/2019 |
| WO | 2020/164873 | A1 | 8/2020 |
| WO | 2020/203717 | A1 | 10/2020 |

OTHER PUBLICATIONS

Kim et al., "Volatile and non-volatile compounds in green tea affected in harvesting time and their correlation to consumer preference". J. Food Sci Technol (Oct. 2016), 53 (10): 3735-3743. (Year: 2016).*
Extended (Supplementary) European Search Report dated Feb. 11, 2025, issued in counterpart EP Application No. 22779883.2. (8 pages).
Shimoda, Mitsuya et al., "Comparison of the Odor Concentrates by SDE and Adsorptive col. Method from Green Tea Infusion", J. Agric. Food Chem., 1995, vol. 43, No. 6, pp. 1616-1620, cited in ISR. (5 pages).
Meng, Tao et al., "Effect of 1-20 years storage on volatiles and aroma of Keemun congou black tea by solvent extraction-solid phase extraction-gas chromatography-mass spectrometry", Food Science and Technology, 2021, 136, 110278, cited in JP Office Action dated Jul. 21, 2022. (23 pages).
Pang, Xueli et al., "Comparison of Potent Odorants in Raw and Ripened Pu-Erh Tea Infusions Based on Odor Activity Value Calculation and Multivariate Analysis: Understanding the Role of Pile Fermentation", J. Agric. Food Chem. 2019, 67, pp. 13139-13149, cited in JP Office Action dated Jul. 21, 2022. (11 pages).
English Translation of International Search Report dated May 10, 2022, issued in counterpart International Application No. PCT/JP2022/010275. (1 page).
Office Action dated Jul. 21, 2022, issued in counterpart JP Application No. 2021-060555, with English translation. (8 pages).

* cited by examiner

*Primary Examiner* — Jenna A Watts
(74) *Attorney, Agent, or Firm* — WHDA, LLP

(57) ABSTRACT

An object of the present invention is to provide a solid composition that provides excellent floral aroma when added to a medium such as water. In the solid composition, linalool and 1-penten-3-one are incorporated, and a weight ratio of linalool content to 1-penten-3-one content is adjusted to not less than 30.

11 Claims, No Drawings

SOLID COMPOSITION HAVING FLORAL SCENT

TECHNICAL FIELD

The present invention relates to a solid composition, and more particularly to a solid composition that provides floral aroma.

BACKGROUND ART

Tea beverages produced from processed tea leaves are widely consumed not only in Japan but also in other countries throughout the world. Some tea beverages are sold in the form of packaged beverages which are beverages sterile packed in packages such as PET bottles or cans, or other tea beverages are sold in the form of tea powders which are made by drying and powdering tea into a powdery form and are intended to be consumed while dissolved in cold or hot water, or the like. Powdery teas that are to be drunk with water or hot water are broadly classified into the following two forms: one being instant teas obtained by drying a liquid tea leaf extract, and the other being powdered teas obtained by pulverizing tea leaves as they are.

With regard to instant teas, various techniques intended to improve tea flavor have been disclosed. For example, the following instant teas have been disclosed: an instant tea obtained by performing extraction of the same tea leaves multiple times repeatedly during the process of preparing a liquid tea leaf extract (PTL 1); and an instant tea characterized in that a caffeine content is reduced by purifying a green tea extract with a mixed solution comprising ethanol and water at a specified ratio (PTL 2). Also disclosed is an instant tea prepared using a monosaccharide or disaccharide such as glucose or maltose for the purpose of preventing a loss of flavor over time (PTL 3). With regard to powdered teas, various techniques intended to improve dispersity or solubility in water have been disclosed—for example: a powdered tea obtained by dispersing a pulverized product of tea leaves in a liquid vegetable extract and then spray-drying the obtained dispersion (PTL 4); and a powdered tea mainly composed of pulverized tea leaves obtained by pulverizing and atomizing tea leaves in an aqueous solution (PTL 5).

CITATION LIST

Patent Literatures

PTL 1: Japanese Unexamined Patent Application Publication No. JP 2013-226111
PTL 2: Japanese Unexamined Patent Application Publication No. JP 2009-72188
PTL 3: Japanese Unexamined Patent Application Publication No. JP 2013-153739
PTL 4: Japanese Unexamined Patent Application Publication No. JP 2010-233559
PTL 5: Japanese Unexamined Patent Application Publication No. JP 2007-289115

SUMMARY OF INVENTION

Technical Problem

Tea beverages, inter alia high-grade green tea beverages, have characteristic aromas—one of those characteristic aromas is called "floral aroma". While various types of solid tea compositions have been developed and sold, there has been no known solid tea composition that provides excellent aroma, in particular excellent floral aroma. Therefore, an object of the present invention is to provide a solid composition that provides excellent floral aroma when added to a medium such as water.

Solution to Problem

The present inventors have made intensive studies to achieve the aforementioned object, and as a result found that when the ratio of linalool content to 1-penten-3-one content in a solid composition is adjusted to be within a specified range, the composition can be perceived to have good floral aroma characteristic of high-grade tea. Based on this finding, the inventors have completed the present invention.

The present invention is directed, but not limited, to the following.

(1) A solid composition comprising linalool and 1-penten-3-one, and having a weight ratio of linalool content to 1-penten-3-one content of not less than 30.

(2) The composition as set forth in (1), wherein the composition is a powder composition.

(3) The composition as set forth in (1) or (2), further comprising two or more types of dextrins.

(4) The composition as set forth in (3), further comprising a linear dextrin and a cyclic dextrin.

(5) The composition as set forth in any one of (1) to (4), further comprising geraniol.

(6) The composition as set forth in any one of (1) to (5), further comprising at least one aroma component selected from the group consisting of α-ionone, 2-methylbutanal, 2,4-heptadienal, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol and indole.

(7) The composition as set forth in any one of (1) to (6), further comprising a tea leaf extract.

(8) The composition as set forth in (7), wherein the tea leaf extract is a Sencha tea leaf extract.

(9) A beverage or food comprising the composition as set forth in any one of (1) to (8).

(10) The beverage or food as set forth in (9), wherein the beverage or food is a beverage.

(11) The beverage or food as set forth in (10), wherein the beverage or food is a tea beverage.

Advantageous Effects of Invention

According to the present invention, a solid composition that provides excellent floral aroma when added to a medium such as water can be provided. The solid composition of this invention can be made with water or hot water into a tea beverage, and the thus-obtained tea beverage can provide floral aroma characteristic of high-grade tea at the time of drinking. The solid composition of this invention is extremely lighter in weight than tea beverages and thus is excellent in convenience during transportation.

Also, the solid composition of the present invention can be used as a source material to make foods. In recent years, there has been a tendency toward an increase in the number and types of tea flavored foods. By using the solid composition of this invention, excellent floral aroma can be imparted to, for example, confectionary foods, such as cakes, sponge cakes, candies, cookies, jellies, puddings and chocolates.

DESCRIPTION OF EMBODIMENTS

Hereunder, the solid composition of the present invention will be described. Unless otherwise specified, the terms "ppm". "ppb" and "wt. %" as used herein refer respectively to ppm, ppb, and wt. % on a weight/weight (w/w) basis.

One embodiment of the present invention is directed to a solid composition comprising linalool and 1-penten-3-one, and having a weight ratio of linalool content to 1-penten-3-one content of not less than 30. By adopting the aforementioned composition profiles, the solid composition can exhibit floral aroma and provide excellent floral aroma. As referred to herein, the term "floral aroma" refers to an aroma that combines a refreshing aroma like lily of the valley with a rose-like sweet scent (Tea Leaf Extract)

The solid composition of the present invention can comprise a tea leaf extract. As referred to herein, the term "tea leaf extract" refers to components extracted from tea leaves. The tea leaves that can be used in the present invention are leaves obtained from plants belonging to the family Theaceae, genus *Camellia* (e.g., *Camellia sinensis* (L) O. Kuntze). The tea leaves used in this invention can be classified into non-fermented tea leaves, semi-fermented tea leaves, and fermented tea leaves depending on the method of processing. Examples of non-fermented tea leaves include, but are not limited to, green tea leaves, such as Aracha (crude tea), Sencha (brewed green tea), Gyokuro (refined green tea), Kabuse-cha (shaded green tea), Tencha (non-ground tea leaves used for Matcha), Bancha (coarse green tea), Houji-cha (roasted green tea), Kamairi-cha (pot-roasted green tea), Kukicha (twig tea), Bocha (roasted twig tea), and Mecha (bud tea). Examples of semi-fermented tea leaves include, but are not limited to, oolong tea leaves, such as Tieguanyin (Tekkanon), Sezhong (Shikishu), Huangjin Gui (Ougonkei), and Wuyi tea (Buigan tea). Examples of fermented tea leaves include, but are not limited to, black tea leaves, such as Darjeeling, Assam, and Sri Lanka. In this invention, one type of tea leaves may be used alone, or two or more types of tea leaves may be used in a blended form. Any parts of plants, such as leaves and stems, can be used, as appropriate, to make tea without particular limitation as long as they are plant parts from which fragrance components can be extracted. Tea leaves can be used in any shapes, without limitation, such as whole or powdered leaf. The tea leaf extract used in this invention is not particularly limited, but a green tea leaf extract is preferably used, with a Sencha tea leaf extract being more preferably used.

The content of a tea leaf extract in the solid composition of the present invention is not particularly limited, and is in the range of, for example, from 30 to 90 wt. %, preferably from 35 to 80 wt. %, more preferably from 40 to 70 wt. %. When the content of a tea leaf extract falls within the aforementioned range, the aroma derived from tea leaves can be fully felt.

(Linalool and 1-penten-3-one)

The solid composition of the present invention comprises linalool and 1-penten-3-one. Linalool is a type of monoterpene alcohol represented by the molecular formula $C_{10}H_{18}O$ (CAS Registry No.: 78-70-6, (R-linalool) 126-91-0, (S-linalool) 126-90-9), and is known to have an aroma like lily of the valley, lavender, and bergamot. 1-Penten-3-one is an organic compound represented by the molecular formula $C_5H_8O$ (CAS Registry No.: 1629-58-9), and is known to smell like rotten onion or to have a foul, pungent odor like that of rubber, a solvent, or a plastic resin.

In the solid composition of the present invention, the weight ratio of linalool content to 1-penten-3-one content (linalool content/1-penten-3-one content) is not less than 30. When 1-penten-3-one is present in combination with linalool at a weight ratio within the aforementioned range, the solid composition can exhibit particularly excellent floral aroma. More specifically, when 1-penten-3-one is present in combination with linalool at a weight ratio within the aforementioned range, the solid composition can be perceived to have sharp floral aroma.

The weight ratio of linalool content to 1-penten-3-one content in the solid composition of the present invention is preferably not less than 40, not less than 70, not less than 100, not less than 120, not less than 200, not less than 240, not less than 300, or not less than 400. Also, the weight ratio of linalool content to 1-penten-3-one content in the solid composition of this invention is preferably not more than 50000, not more than 10000, not more than 5000, not more than 2000, or not more than 1000. Typically, the weight ratio of linalool content to 1-penten-3-one content in the solid composition of this invention is in the range of preferably from 240 to 5000, more preferably from 300 to 2000, still more preferably from 400 to 1000.

The linalool content in the solid composition of the present invention is not particularly limited, and is for example not less than 0.001 ppm, preferably not less than 0.002 ppm, not less than 0.005 ppm, not less than 0.01 ppm, not less than 0.02 ppm, not less than 0.05 ppm, not less than 0.1 ppm, not less than 0.3 ppm, not less than 0.8 ppm, not less than 1 ppm, not less than 1.5 ppm, not less than 5 ppm, or not less than 10 ppm. When the linalool content falls within the aforementioned range, the solid composition can exhibit excellent floral aroma. The upper limit of the linalool content in the solid composition of this invention is not particularly limited. For example, the linalool content is not more than 10000 ppm, preferably not more than 5000 ppm, not more than 4000 ppm, not more than 3000 ppm, not more than 2000 ppm, not more than 1000 ppm, not more than 500 ppm, not more than 200 ppm, or not more than 100 ppm. Thus, the linalool content in the solid composition of this invention is typically in the range of from 0.001 to 10000 ppm, preferably from 0.1 to 5000 ppm, more preferably from 1 to 2000 ppm, still more preferably from 10 ppm to 1000 ppm.

The 1-penten-3-one content in the solid composition of the present invention is not particularly limited, and is for example not more than 100 ppm, preferably not more than 70 ppm, not more than 50 ppm, not more than 20 ppm, not more than 15 ppm, not more than 5 ppm, not more than 1 ppm, or not more than 0.5 ppm. When 1-penten-3-one is present in combination with linalool in an amount within the aforementioned range, the solid composition of this invention can exhibit excellent floral aroma.

(Geraniol)

The solid composition of the present invention can further comprise geraniol. Geraniol is a type of linear monoterpenoid represented by the chemical formula $C_{10}H_{17}OH$. (CAS Registry No: 106-24-1). It is known that geraniol is found in essential oils like rose oil, palmarosa oil, and citronella oil, and has a rose-like aroma.

The geraniol content in the solid composition of the present invention is not particularly limited, and is for example not less than 0.01 ppm, preferably not less than 0.02 ppm, not less than 0.05 ppm, not less than 0.1 ppm, not less than 0.2 ppm, not less than 0.5 ppm, not less than 1 ppm, not less than 2 ppm, not less than 5 ppm, not less than 10 ppm, or not less than 20 ppm. When the geraniol content falls within the aforementioned range, the solid composition of this invention can exhibit more excellent floral aroma. The upper limit of the geraniol content in the solid composition of this invention is not particularly limited. For example, the geraniol content is not more than 10000 ppm, preferably not more than 5000 ppm, not more than 2000 ppm, not more than 1000 ppm, not more than 500 ppm, not more than 200 ppm, not more than 100 ppm, or not more than 50 ppm. Thus, the geraniol content in the solid composition of this invention is typically in the range of from 0.01 to 10000 ppm, preferably from 0.1 to 2000 ppm, more preferably from 0.5 to 1000 ppm, still more preferably from 1 to 500 ppm.

The weight ratio of geraniol content to 1-penten-3-one content (geraniol content/1-penten-3-one content) in the solid composition of the present invention is preferably not less than 1.5, not less than 5, not less than 30, or not less than 50. Also, the weight ratio of geraniol content to 1-penten-3-one content (geraniol content/1-penten-3-one content) in the solid composition of this invention is preferably not more than 10000, not more than 5000, not more than 2000, not more than 1000, or not more than 500. Typically, the weight ratio of geraniol content to 1-penten-3-one content (geraniol content/1-penten-3-one content) in the solid composition of this invention is in the range of preferably from 5 to 2000, more preferably from 30 to 1000, still more preferably from 50 to 500.

The ratio of linalool content to geraniol content in the solid composition of the present invention is not particularly limited. The ratio of linalool content to geraniol content linalool (linalool:geraniol) on a weight basis is in the range of, for example, from 1:50 to 50:1, preferably from 1:10 to 20:1, more preferably from 1:5 to 10:1, still more preferably from 1:1 to 5:1.

The total linalool and geraniol content in the solid composition of the present invention is not particularly limited, and is for example not less than 0.1 ppm, preferably not less than 0.2 ppm, not less than 0.3 ppm, not less than 0.5 ppm, not less than 1 ppm, not less than 5 ppm, or not less than 10 ppm. The upper limit of the total linalool and geraniol content in the solid composition of this invention is not particularly limited. For example, the total linalool and geraniol content is not more than 10000 ppm, preferably not more than 5000 ppm, not more than 3000 ppm, not more than 2000 ppm, not more than 1000 ppm, not more than 500 ppm, or not more than 200 ppm. Thus, the total linalool and geraniol content in the solid composition of this invention is typically in the range of from 0.1 to 10000 ppm, preferably from 1 to 1000 ppm, more preferably from 5 to 500 ppm, still more preferably from 10 to 200 ppm.

In the present invention, the contents of linalool, 1-penten-3-one, and geraniol in the solid composition can be measured using gas chromatography/mass spectrometry (GC/MS). As a GC/MS analysis system, Shimadzu Nexis GC-2030 (produced by Shimadzu Corporation) can be used. To be specific, by using a solution prepared by dissolving the solid composition of this invention in water, the contents of the above aroma components can be measured under the conditions detailed below.
System:
   GC: Shimadzu Nexis GC-2030
   MS: Shimadzu GCMS-QP2020NX
   HS: Shimadzu AOC-6000
   SPME: SPME Arrow 1.10 mm (DVB/C-WR/PDMS)
   Column: GL Sciences InertCap 60 m×0.25 mm i.d., df=0.25 μm
   Temperature conditions: 40° C. (kept for 4 min.), then increasing at a rate of 5° C./min. to 240° C.
   Carrier gas flow rate: Helium, 1.43 mL/min.
   Injection method: Split (split ratio 1:9)
   Ion source temperature: 200° C.

The conditions for measurement samples can be set as detailed later in the Examples section. After the contents of aroma components in a solution are measured, the contents of aroma components in the solid composition can be determined by back calculation from the amount of the solid composition dissolved in water.

In the present invention, when aroma components such as linalool and geraniol are present in the form of glucosides, the contents of such aroma components, unless otherwise specified, refer to the contents of those aroma components alone, such as linalool alone or geraniol alone, excluding those of sugar moieties. Removal of glucosidic moieties (sugar moieties) can be performed using an appropriate sugar hydrolase.

(Dextrin)

The solid composition of the present invention can comprise a dextrin. The term "dextrin" is a generic term for carbohydrates produced by the hydrolysis of starch or glycogen. In this invention, the dextrin can be used as an excipient to form a solid composition. The type of a dextrin used in the solid composition of this invention is not particularly limited, and at least one type, at least two types, at least three types, or at least four types of dextrins can be used, with preferably at least two types, more preferably at least three types, of dextrins being used.

The dextrin content in the solid composition of the present invention is not particularly limited, and the total dextrin content is in the range of, for example, from 10 to 70 wt. %, preferably from 20 to 65 wt. %, more preferably from 30 to 60 wt. %. In this invention, a commercially available dextrin product can be used. The dextrin content in the solid composition can be measured by sugar analysis using a method known to skilled artisans.

The type of a dextrin used in the present invention is not particularly limited, and examples thereof include, but are not limited, a linear dextrin, a cyclic dextrin, and a spiral dextrin. As referred to herein, the term "linear dextrin" refers to a dextrin that is composed of glucoses linked in a straight chain form or in the form of chains with branches and which does not form a ring structure or a spiral structure. Also, as referred to herein, the term "cyclic dextrin" refers to a dextrin that is composed of glucoses linked to form a cyclic structure and which does not form a spiral structure. As referred to herein, the term "spiral dextrin" refers to a dextrin composed of glucoses linked to form a spiral structure. The solid composition of this invention preferably comprises a linear dextrin and a cyclic dextrin.

The type of the linear dextrin is not particularly limited, and examples thereof that can be used include linear dextrins with a DE (dextrose equivalent) of from 1 to 25, and linear dextrins with a weight average molecular weight of from 500 to 160,000. In the present invention, one type of linear dextrin may be used alone, or two or more types thereof may be used in combination. In a preferred embodiment of this invention, two types of linear dextrins are used. For example, in the case of using two types of linear dextrins, a combination of a linear dextrin with a DE of from 2 to 5 and a linear dextrin with a DE of from 16 to 20, or a combination of a linear dextrin with a weight average molecular weight of from 90,000 to 140,000 and a linear dextrin with a weight average molecular weight of from 600 to 1,200, can be used.

In the case of using a linear dextrin(s), the content of the linear dextrin(s) in the solid composition of the present invention is in the range of, for example, from 0 to 65 wt. %, preferably from 10 to 60 wt. %, more preferably from 15 to 55 wt. %. When the two types of linear dextrins to be used are a linear dextrin with a DE of from 2 to 5 and a linear dextrin with a DE of from 16 to 20, the content of the linear dextrin with a DE of from 2 to 5 in the solid composition of this invention is in the range of, for example, from 0 to 60 wt. %, preferably from 5 to 50 wt. %, more preferably from 10 to 45 wt. %, and the content of the linear dextrin with a DE of from 16 to 20 in the solid composition of this invention is in the range of, for example, from 0 to 60 wt. %, preferably from 5 to 50 wt. %, more preferably from 10 to 45 wt. %. The ratio (weight ratio) of the content of the linear dextrin with a DE of from 2 to 5 to that of the linear dextrin with a DE of from 16 to 20 is in the range of, for example, from 4:0.5 to 0.5:5, preferably from 3:1 to 1:5, more preferably from 2:1 to 1:4.

When the two types of linear dextrins to be used are a linear dextrin with a weight average molecular weight of from 90,000 to 140,000 and a linear dextrin with a weight average molecular weight of from 600 to 1,200, the content of the linear dextrin with a weight average molecular weight of from 90,000 to 140,000 in the solid composition of the present invention is in the range of, for example, from 0 to 65 wt. %, preferably from 10 to 60 wt. %, more preferably from 15 to 55 wt. %, and the content of the linear dextrin with a weight average molecular weight of from 600 to 1,200 is in the range of, for example, from 5 to 60 wt. %, preferably from 5 to 50 wt. %, more preferably from 10 to 45 wt. %. The ratio (weight ratio) of the content of the linear dextrin with a weight average molecular weight of from 90,000 to 140,000 to that of the linear dextrin with a weight average molecular weight of from 600 to 1,200 is in the range of, for example, from 5:1 to 1:3, preferably from 3:1 to 1:2, more preferably from 2:1 to 1:1.

Examples of the cyclic dextrin that can be used include cyclodextrins. In the present invention, α-cyclodextrin, β-cyclodextrin, and γ-cyclodextrin can all be used, with α-cyclodextrin being preferably used. The weight average molecular weight of the cyclic dextrin used in this invention is not particularly limited, and is in the range of, for example, from 700 to 1,300, preferably from 800 to 1,200, more preferably from 900 to 1,100. In the case of using a cyclic dextrin, the content of the cyclic dextrin in the solid composition of this invention is in the range of, for example, from 0.5 to 15 wt. %, preferably from 1 to 12 wt. %, more preferably from 3 to 10 wt. %.

In the case of using a linear dextrin and a cyclic dextrin in combination, the ratio (weight ratio) of the content of the linear dextrin to that of the cyclic dextrin is in the range of, for example, from 20:1 to 2:1, preferably from 15:1 to 3:1, more preferably from 12:1 to 5:1.

The solid composition of the present invention may comprise a spiral dextrin. The DE value of the spiral dextrin used in this invention is not particularly limited and is, for example, less than 7, preferably less than 6, more preferably less than 5. In the case of using a spiral dextrin, the content of the spiral dextrin in the solid composition of the present invention is in the range of, for example, from 0 to 45 wt. %, preferably from 5 to 30 wt. %, more preferably from 10 to 20 wt. %. Further, in the case of using a spiral dextrin, the ratio (weight ratio) of the content of a linear dextrin to that of a spiral dextrin is in the range of, for example, from 1:3 to 3:1, preferably from 1:2 to 2:1, more preferably from 1:1.5 to 1.5:1.

(Other Aroma Components)

The solid composition of the present invention can further comprise, in addition to linalool, 1-penten-3-one, and geraniol as mentioned above, at least one aroma component selected from the group consisting of α-ionone, 2-methylbutanal, 2,4-heptadienal, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol and indole. When such aroma components are incorporated in the solid composition of this invention, the solid composition can exhibit still more excellent floral aroma.

The (z)-3-hexenol content in the solid composition of the present invention is in the range of, for example, from 0.1 to 50 ppm, preferably from 0.5 to 20 ppm, more preferably from 1 to 10 ppm. The 1-penten-3-ol content in the solid composition of this invention is in the range of, for example, from 0.1 to 50 ppm, preferably from 0.5 to 20 ppm, more preferably from 1 to 10 ppm. The nerolidol content in the solid composition of this invention is in the range of, for example, from 0.01 to 20 ppm, preferably from 0.05 to 10 ppm, more preferably from 0.1 to 5 ppm. The hexanal content in the solid composition of this invention is in the range of, for example, from 0.01 to 20 ppm, preferably from 0.05 to 10 ppm, more preferably from 0.1 to 5 ppm. The (E)-linalool oxide content in the solid composition of this invention is in the range of, for example, from 0.1 to 1000 ppm, preferably from 1 to 100 ppm, more preferably from 5 to 50 ppm. The β-myrcene content in the solid composition of this invention is in the range of, for example, from 0.01 to 1000 ppm. The trans-β-ocimene content in the solid composition of this invention is in the range of, for example, from 0.01 to 1000 ppm. The L-α-terpineol content in the solid composition of this invention is in the range of, for example, from 0.01 to 1000 ppm. The methyl salicylate content in the solid composition of this invention is in the range of, for example, from 0.01 to 1000 ppm. The benzyl alcohol content in the solid composition of this invention is in the range of, for example, from 0.1 to 100 ppm, preferably from 0.5 to 10 ppm, more preferably from 1 to 5 ppm. The indole content in the solid composition of this invention is in the range of, for example, from 0.01 to 1000 ppm.

In the present invention, the contents of α-ionone, 2-methylbutanal, 2,4-heptadienal, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol and indole in the solid composition can be measured using gas chromatography/mass spectroscopy (GC/MS). To be specific, the contents of the above aroma components can be measured under the conditions detailed below.

System:
  GC: Shimadzu Nexis GC-2030
  MS: Shimadzu GCMS-QP2020NX
  HS: Shimadzu AOC-6000
  SPME: SPME Arrow 1.10 mm (DVB/C-WR/PDMS)
  Column: GL Sciences InertCap 60 m×0.25 mm i.d., df=0.25 μm
  Temperature conditions: 40° C. (kept for 4 min.), then increasing at a rate of 5° C./min. to 240° C.
  Carrier gas flow rate: Helium, 1.43 mL/min.
  Injection method: Split (split ratio 1:9)
  Ion source temperature: 200° C.

The conditions for measurement samples can be set as detailed later in the Examples section.

(Extract Containing Linalool and 1-penten-3-one)

In the solid composition of the present invention, linalool and 1-penten-3-one may be used as respective purified products or respective crude purified products, or may be used in the form of an extract containing linalool and 1-penten-3-one. As the extract containing linalool and 1-penten-3-one, a naturally occurring extract can be used, and a vegetable extract or an animal extract can be used. In this invention, a vegetable extract is preferably used, and in particular, a tea leaf extract is more preferably used. Although the type of the extract containing linalool and 1-penten-3-one is not particularly limited, the extract is preferably of a different type from the tea leaf extract described above. In other words, when the aforementioned tea leaf extract is regarded as a first tea leaf extract, the tea leaf extract containing linalool and 1-penten-3-one can be used as a second tea leaf extract different from the first tea leaf extract. Also, the second tea leaf extract may further contain geraniol. Additionally, in this invention, linalool and 1-penten-3-one may be derived from the first tea leaf extract. In this invention, the contents of linalool and 1-penten-3-one, regardless of their origin, mean the amounts of these components contained in the solid composition of this invention.

The tea leaves used as a source material to make a tea leaf extract containing linalool and 1-penten-3-one are preferably non-fermented tea leaves, and specific examples thereof include green tea leaves, such as Aracha, Sencha, Gyokuro, Kabuse-cha, Kukicha, Karigane (stems of Gyokuro and high-grade Sencha), Tenbone (roasted Tencha stems), Tencha, Bancha, and Houji-cha. The tea leaf extract containing linalool and 1-penten-3-one may be an extract from a single type of tea leaves or may be an extract from a blend of two or more types of tea leaves. In this invention, the tea leaf extract containing linalool and 1-penten-3-one is preferably a green tea leaf extract, more preferably an extract from stems of Kukicha, Karigane, Tenhone, or the like. By using stems of Kukicha, Karigane, Tenbone, or the like, not only linalool and 1-penten-3-one, but also other aroma components derived from such stems can be contained in the tea leaf extract, which can impart more excellent aroma characteristic of high-grade green tea to the solid composition.

In the case of using a tea leaf extract containing linalool and 1-penten-3-one, the content of the tea leaf extract is not particularly limited, and can be adjusted such that the contents of linalool and 1-penten-3-one in the solid composition of the present invention fall within the aforementioned ranges.

(Other Additives)

The solid composition of the present invention not only comprises the aforementioned components, but also can have added thereto other additives commonly used in beverages and foods, such as antioxidant, preservative, pH adjustor, sweetener, enrichment, thickening stabilizer, emulsifier, dietary fiber, and quality stabilizer, to the extent that such additives do not impair the effects of this invention.

(Solid Composition)

The form of the solid composition of the present invention is not particularly limited, and the solid composition of this invention is preferably in a powder form, or namely a powder composition. In this invention, the powder composition has only to be in the form of powder, including granules. In this invention, the particle size of the powder composition is not particularly limited, and is in the range of, for example, from 0.1 to 500 μm, preferably from 1 to 300 μm, more preferably from 10 to 200 μm.

The solid composition of the present invention can be incorporated in a beverage or food. In other words, this invention can provide a beverage or food comprising the aforementioned solid composition. The solid composition of this invention is preferably incorporated in a liquid to prepare a beverage, and most preferably consumed in the form of a tea beverage prepared by dissolving the solid composition in water, hot water or the like. From this viewpoint, the solid composition of this invention can be provided as an instant tea. As referred to herein, the term "instant tea" refers to a powder beverage prepared by drying and powdering a solution of a liquid tea leaf extract used as a source material. Examples of tea beverages include non-fermented teas (e.g., green tea), semi-fermented teas (e.g., oolong tea), and fermented teas (e.g., black tea). Specific examples thereof include: steamed, non-fermented teas (green teas), such as Sencha, Bancha, Houji-cha, Gyokuro, Kabuse-cha, and Tencha; non-fermented teas including Kamairi-cha such as Ureshinocha, Aoyagicha, and different Chinese teas; semi-fermented teas such as Hoshucha, Tek-kanon tea, and oolong tea; and fermented teas such as black tea, Awa-bancha, and puerh tea. The tea beverage in which the solid composition of this invention is used is preferably a green tea. In other words, the solid composition of this invention can be provided as an instant green tea.

When the solid composition of the present invention is incorporated in a liquid such as water or hot water, the content of the solid composition in a solution is not particularly limited, and is in the range of, for example, from 0.01 to 20 wt. %, preferably from 0.05 to 10 wt. %, more preferably from 0.1 to 5.0 wt. %. Also, the content of the solid composition in a solution may be adjusted so as to ensure, for example, that the linalool content in the solution falls within the range of from 1 to 1000 ppb, preferably from 3 to 500 ppb, more preferably from 5 to 300 ppb, still more preferably from 10 to 200 ppb, or that the 1-penten-3-one content in the solution falls within the range of from 0.001 to 5 ppb, preferably from 0.001 to 2 ppb, more preferably from 0.001 to 1 ppb, still more preferably from 0.01 to 0.5 ppb.

When the solid composition contains geraniol, the content of the solid composition in a solution may be adjusted so as to ensure that the geraniol content in the solution falls within the range of from 1 to 800 ppb, preferably from 3 to 400 ppb, more preferably from 5 to 200 ppb, still more preferably from 10 to 100 ppb. Further, the content of the solid composition in a solution may be adjusted so as to ensure that the total linalool and geraniol content in the solution falls within the range of from 1 to 1000 ppb, preferably from 5 to 800 ppb, more preferably from 10 to 600 ppb, still more preferably from 20 to 400 ppb.

The solid composition of the present invention can also be added to a food. Examples of foods include confectionary foods, such as cakes, sponge cakes, candies, cookies, jellies, puddings, and chocolates, frozen desserts such as ice cream, ice candy, and sherbet; and snacks, regardless of whether they are Japanese or Western confectionaries. Also, the solid composition of this invention can be used in breads or dairy products. When the solid composition of the present invention is added to a food, the amount of the solid composition added can be determined, as appropriate, depending on, for example, the type of the food.

When the solid composition of the present invention is added to a food, the amount of the solid composition added can be determined, as appropriate, depending on, for example, the type of the food. The solid composition of this invention can be added to a food so as to ensure that the content of the solid composition in the food falls within the range of, for example, from 0.01 to 20 wt. %, preferably from 0.05 to 10 wt. %, more preferably from 0.1 to 5 wt. %, still more preferably from 0.5 to 5.0 wt. %.

Also, the amount of the solid composition of the present invention added to a food can be determined using the content(s) of the aforementioned aroma component(s) as an index. For example, the solid composition of this invention can be added to a food so as to ensure that the linalool content in the food falls within the range of from 1 to 1000 ppb, preferably from 3 to 500 ppb, more preferably from 5 to 300 ppb, still more preferably from 10 to 200 ppb. For example, the solid composition of this invention can be added to a food so as to ensure that the 1-penten-3-one content in the food falls within the range of from 0.001 to 5 ppb, preferably from 0.005 to 3 ppb, more preferably from 0.01 to 2 ppb, still more preferably from 0.1 to 1 ppb.

When the solid composition contains geraniol, the solid composition of the present invention can be added to a food so as to ensure that the geraniol content in the food falls within the range of, for example, from 1 to 800 ppb, preferably from 3 to 400 ppb, more preferably from 5 to 200 ppb, still more preferably from 10 to 100 ppb. Also, the solid composition of this invention can be added to a food so as to ensure that the total linalool and geraniol content in the food falls within the range of from 1 to 1000 ppb, preferably from 5 to 800 ppb, more preferably from 10 to 600 ppb, still more preferably from 20 to 400 ppb.

(Production Method)

The solid composition of the present invention can be produced through the steps of (A) preparing a solution comprising a tea leaf extract, linalool and 1-penten-3-one, and (B) drying the prepared solution. Said solution not only comprises a tea leaf extract, linalool and 1-penten-3-one, but also may contain a dextrin and/or other additives as mentioned above. The amounts of any of these components to be added can be determined, as appropriate, to the extent that such components do not impair the effects of this invention. The order of adding such components is not particularly limited. As a solvent for preparing the solution, water may be used or a liquid tea leaf extract may be used as it is. Although said solution may have a weight ratio of linalool content to 1-penten-3-one content of not less than 30, it is only necessary that the finally produced solid composition should have a weight ratio of linalool content to 1-penten-3-one content of not less than 30.

The solution can be dried using a method conventionally known to skilled artisans. Examples of drying methods include spray-drying, freeze drying, hot-air drying, and vacuum drying, with spray-drying being preferably used in the present invention. The conditions for spray-drying, such as drying temperature and time, are not particularly limited, and can be adjusted as appropriate.

The process of producing the solid composition of the present invention not only comprises the aforementioned steps, but also may comprise a step of concentrating the solution obtained at step (A), a step of heat-treating the solution obtained at step (A), and/or the like. All of these additional steps can be performed using a method conventionally known to skilled artisans.

With regard to linalool and 1-penten-3-one as used at step (A), a tea leaf extract (second tea leaf extract) containing these components may be used as mentioned above. Said second tea leaf extract may further contain geraniol. By mixing a first tea leaf extract with the second tea leaf extract, the solution at step (A) can be prepared. The tea leaf extract (second tea leaf extract) containing linalool and 1-penten-3-one can be prepared through taking a step of distilling tea leaves, although the step taken to prepare the second tea leaf extract is not particularly limited to the above one. The tea leaves used as a source material to make the second tea leaf extract are as described above. In this invention, stems of Kukicha, Karigane, Tenbone, or the like can be preferably used as a source material.

Distillation of tea leaves to make a tea leaf extract (second tea leaf extract) containing linalool and 1-penten-3-one is typically performed using a steam distillation method. Steam distillation is a method in which steam is passed through a source material (tea leaves) and aroma components distilled out together with steam are aggregated by cooling. Exemplary modes of steam distillation that can be adopted include atmospheric steam distillation, vacuum steam distillation, and gas-liquid multistage countercurrent contact distillation (spinning cone column). In this invention, atmospheric steam distillation is preferably used. Steam distillation of tea leaves is typically performed by a decoction type steam distillation method. The decoction type steam distillation is a method in which a source material (tea leaves) is heated in a state soaked in water and the generated steam is collected and cooled to obtain a distillate.

The tea leaf extract (second tea leaf extract) containing linalool and 1-penten-3-one as obtained by a steam distillation method can be further subjected to a concentration step to enhance the concentrations of aroma components. Concentration of the second tea leaf extract is typically performed by a distillative concentration method. The distillative concentration can be performed by, for example, employing a procedure in which the tea leaf extract is placed in a still and boiled by heating from the bottom to collect aroma components distilled out together with steam. For the distillative concentration, an atmospheric distillative concentration method or a vacuum distillative concentration method can be employed. In this invention, the vacuum distillative concentration method is preferably employed. Also, an operation called salting-out may be performed at the step of distillative concentration. By performing the salting-out treatment, water molecules can be attracted by the polarity of a salt in a distillate placed in a still, thereby promoting the vaporization of organic compounds. The salting-out treatment can be performed by incorporating a salt such as sodium chloride into a distillate to be concentrated.

The tea leaf extract (second tea leaf extract) containing linalool and 1-penten-3-one may be produced by taking a further step of treatment with activated carbon. By performing activated carbon treatment, the amounts of unwanted aroma components can be reduced. As referred to herein, the term "activated carbon" refers to a porous, carbon-based substance produced through activation of carbon-containing materials such as wood at high temperatures.

(Method for Enhancing the Floral Aroma of a Beverage or Food)

The solid composition of the present invention as obtained in the aforementioned manner can be added to a beverage or food, so that the floral aroma of the beverage or food can be enhanced. For this reason, in another embodiment, this invention can be directed to a method for enhancing the floral aroma of a beverage or food, the method comprising a step of adding the solid composition obtained through the aforementioned steps to the beverage or food.

EXAMPLES

Hereunder, the present invention will be described by way of working examples, but this invention is not limited to these examples.

1. Preparation of a Solid Composition (Powder Composition)

(1-1) Liquid Tea Leaf Extract

A tea extraction tank was charged with commercial Sencha tea leaves, and also with a dextrin (20 wt. parts per 100 wt. parts of Sencha), tannase (11.2 wt. parts per 100 wt. parts of Sencha), L-ascorbic acid (3 wt. parts per 100 wt. parts of Sencha) and sodium bicarbonate (1.2 wt. parts per 100 wt. parts of Sencha), and then further charged with hot water in an amount equal to 15 times the amount of Sencha charged (15 L per kg of Sencha), and the mixture was held at 45° C. for 20 minutes to prepare a liquid tea leaf extract. The dextrin used was a mixture of a linear dextrin (weight average molecular weight: 120000; DE: 2 to 5) and α-cyclodextrin at a weight ratio of 4:1. The prepared liquid tea leaf extract was subjected to solid-liquid separation (to remove residues of tea leaf extraction), and then mixed with a dextrin (linear dextrin) added in an amount of 4.1 wt. parts per 100 wt. parts of the liquid tea leaf extract, and the mixture was heat-treated under the conditions of 90° C. for 30 seconds. After removal of insolubles (tea leaves), the liquid tea leaf extract was concentrated by membrane concentration using a reverse osmosis membrane, to thereby prepare a liquid tea leaf extract having a Brix value, i.e. solids concentration in solution, of 26.5.

(1-2) Tea Leaf Distillate

Separately from the aforementioned process, a distillate was prepared from tea leaves. To be specific, commercial Kukicha tea leaves (Tenbone) were mixed with water in an amount equal to 6 times that of Tenbone (15 L per kg of Tenbone). Then, after citric acid was further added in an amount of from 2 to 3 wt. parts per 100 wt. parts of the tea leaves, the mixture was held at 50° C. for 1 to 2 hours to effect heat treatment of the tea leaves. Next, the treated solution containing the tea leaves was placed in a steam still, and decoction type steam distillation was performed under the following conditions: the steam pressure was set to 0.20 MPa; the steam flow rate was set to a value sufficient to collect a distillate (aroma) in an amount of about 50 to 60 wt. % based on the weight of the source materials in about 30 minutes; and the steam temperature was set to 100° C. (at atmospheric pressure). The distillate (aroma) was collected by condensing the steam such that the temperature of the distillate (aroma) fell below 20° C. The time of distillate collection was set to about 30 minutes after the distillate started to distill out. This operation was repeated six times to collect the distillate in an amount of about 50 to 60% based on the weight of the source materials. By further repeating this operation three or more times, a distillate was obtained in an amount required for a subsequent step of producing tea powder.

The obtained distillate was treated with activated carbon. To be specific, wood-derived powder activated carbon with an average pore diameter of 3 nm was added to the distillate (aroma) at a concentration of about 50 wt. % to effect activated carbon treatment within 60 minutes, and then, the activated carbon was removed from the distillate using a filter. The treatment temperature used during the activated carbon treatment was set to about 20° C.

Further, the distillate treated with activated carbon was placed in a still, and the interior of the still was depressurized to −0.085 MPa using a vacuum pump. The depressurized still was heated at a steam pressure of 0.20 MPa to raise the temperature of the distillate to 60° C. A distillate was collected by condensing the steam such that the temperature of the distillate (aroma) fell below 20° C. The distillate was collected over about 4 hours after the distillate stated to distill out. The amount of distillate obtained was about 10 wt. % of the amount of the distillate (aroma) charged to the still. This operation was repeated not less than six times to collect the distillate. By further repeating this operation three more times, followed by 10-fold concentration, a distillate (aroma) was obtained in an amount required for a subsequent step of producing tea powder. The thus-obtained distillate was used as a tea leaf distillate.

(1-3) Powder Composition

The liquid tea leaf extract obtained in (1-1) was mixed with the tea leaf distillate obtained in (1-2) (1.6 wt. parts of the tea leaf distillate per 100 wt. parts of the liquid tea leaf extract), and then the mixed solution was heat-treated under the conditions of 90° C. for 45 seconds. The heat-treated solution was spray-dried using a spray dryer to prepare a powder composition.

(1-4) Evaluation of Powder Composition

When the above obtained powder composition was dissolved in water, the solution was perceived to have excellent floral aroma. As a result of analyzing this powder composition, different aroma components were detected, such as linalool, 1-penten-3-one, geraniol, α-ionone, 2-methylbutanal, 2,4-heptadienal, β-cyclocitral, nerolidol, hexanal, 1-penten-3-ol, (z)-3-hexenol, (E)-linalool oxide, β-myrcene, trans-β-ocimene, L-α-terpineol, methyl salicylate, benzyl alcohol, and indole. With the presence of linalool and 1-penten-3-one being particularly focused among those aroma components, the concentrations of these two components in this powder composition were measured by following the procedure described below.

<Calibration Curve>

Standard stock solutions (in ethanol solvent) were prepared so as to ensure that each of the aroma components of interest was present at a concentration of 1000 ppm. Each stock solution was diluted with pure water to concentrations of 0.004, 0.02, 0.05, 0.1, 0.2, and 0.5 ppm. 10 mL each of the prepared solutions was transferred into a 20 mL glass vial containing 3 g of sodium chloride, and the thus-obtained samples were used for calibration curve plotting.

<Preparation of an Analysis Sample>

The tea aroma composition was diluted with pure water, as appropriate, to give a concentration that fell within the concentration range of the calibration curve, and 10 mL of the diluted solution and 3 g of sodium chloride were placed in a 20 mL glass vial to thereby prepare an analysis sample.

<Component Analysis>

The concentrations of the different aroma components were measured using a gas chromatographic analysis system (Shimadzu Nexis GC-2030 (produced by Shimadzu Corporation)).

System:

GC: Shimadzu Nexis GC-2030

MS: Shimadzu GCMS-QP2020NX

HS: Shimadzu AOC-6000

SPME: SPME Arrow 1.10 mm (DVB/C-WR/PDMS)

Column: GL Sciences InertCap 60 m×0.25 mm i.d., df=0.25 μm

Temperature conditions: 40° C. (kept for 4 min.), then increasing at a rate of 5° C./min. to 240° C.

Carrier gas flow rate: Helium, 1.43 mL/min.

Injection method: Split (split ratio 1:9)

Ion source temperature: 200° C.

As a result of the above measurement, the concentrations of linalool and 1-penten-3-one in the analysis sample were found to be 119.7 ppb and 0.16 ppb, respectively.

2. Study on the Ratio of Aroma Components (1)

Based on the measurement results given above, a focus was placed on the content ratio of linalool and 1-penten-3-one, and in particular, a study was made on the weight ratio of linalool content to 1-penten-3-one content (linalool/1-penten-3-one).

First, a base powdered tea was prepared. To be specific, a tea extraction tank was charged with commercial Sencha tea leaves, and also with a dextrin (20 wt. parts per 100 wt. parts of Sencha), tannase (11.2 wt. parts per 100 wt. parts of Sencha), L-ascorbic acid (3 wt. parts per 100 wt. parts of Sencha) and sodium bicarbonate (1.2 wt. parts per 100 wt. parts of Sencha), and then further charged with hot water in an amount equal to 15 times the amount of Sencha charged (15 L per kg of Sencha), and the mixture was held at 45° C. for 20 minutes to prepare a liquid tea leaf extract. The dextrin used was a mixture of a linear dextrin (weight average molecular weight: 120000; DE: 2 to 5) and α-cyclodextrin at a weight ratio of 4:1. The prepared liquid tea leaf extract was subjected to solid-liquid separation (to remove residues of tea leaf extraction), and then mixed with a dextrin (linear dextrin) added in an amount of 4.1 wt. parts per 100 wt. parts of the liquid tea leaf extract, and the mixture was heat-treated under the conditions of 90° C. for 30 seconds. After removal of insolubles (tea leaves), the liquid tea leaf extract was concentrated by membrane concentration using a reverse osmosis membrane, to thereby prepare a liquid tea leaf extract having a Brix value, i.e. solids concentration in solution, of 25.6. Finally, the obtained liquid tea leaf extract was heat-treated under the conditions of 90° C. for 45 seconds to thereby prepare a liquid tea leaf extract. The heat-treated liquid tea leaf extract was spray-dried to obtain a base powdered tea (powder).

Next, 1 g of the above obtained powdered tea was added to 100 mL of water to prepare a powdered tea solution. To the powdered tea solution, linalool, 1-penten-3-one, and geraniol reference standards were added to give different final concentrations as indicated in the table given below, whereby different concentrations of samples were prepared. Since the aroma component concentrations in the different reference standards were unknown, concentration measurements of the reference standards had been done by gas chromatography in advance. To be specific, the linalool, 1-penten-3-one, and geraniol reference standards were diluted with 50 to 5000 times their weights of pure water to adjust their concentrations, as appropriate, to lie within the ranges of the calibration curves, whereby samples for concentration measurement were prepared. The gas chromatographic analysis was done by following the same procedure as described above. Additionally, the linalool, 1-penten-3-one and geraniol concentrations in the powdered tea per se before addition of the reference standards were 66.5 ppb, 0 ppb and 0 ppb (below the limit of detection), respectively.

The different samples prepared using the reference standards were subjected to sensory evaluation by two panelists who were well trained in aroma evaluation. In this sensory evaluation, the extent of floral aroma perceived from the samples, gassy odor and steamy sensation, and the favorableness of floral aroma perceived from the samples were rated according to the rating scales detailed below, and the ratings given by the panelists were averaged. As referred to above, the term "steamy sensation" refers to a heating sensation which obscures aroma profiles.

<Extent of Floral Aroma>
  1 point: No floral aroma is perceived.
  2 points: A slight floral aroma is perceived.
  3 points: A floral aroma is perceived.
  4 points: A somewhat strong floral aroma is perceived.
  5 points: A strong floral aroma is perceived.
<Gassy Odor and Steamy Sensation>
  1 point: No gassy odor or steamy sensation is perceived.
  2 points: Slight gassy odor and steamy sensation are perceived.
  3 points: Gassy odor and steamy sensation are perceived.
  4 points: Somewhat strong gassy odor and steamy sensation are perceived.
  5 points: Strong gassy odor and steamy sensation are perceived.
<Favorableness of Floral Aroma>
  1 point: Unfavorable.
  2 points: Somewhat favorable (somewhat excellent in floral aroma).
  3 points: Favorable (excellent in floral aroma).
  4 points: Very favorable (extremely excellent in floral aroma).

TABLE 1

| | Linalool [ppb] | 1-Penten-3-one [ppb] | Geraniol [ppb] | Linalool/ 1-penten-3-one | Geraniol/ 1-penten-3-one | Rating | | |
| --- | --- | --- | --- | --- | --- | --- | --- | --- |
| | | | | | | Floral aroma | Gassy odor/ steamy sensation | Favorableness |
| Sample 1-1 | 120 | 0.2 | 0 | 600 | — | 3 | 1 | 3 |
| Sample 1-2 | 120 | 0.3 | 0 | 400 | — | 3 | 1 | 3 |
| Sample 1-3 | 120 | 0.5 | 0 | 240 | — | 2.5 | 1.5 | 3 |
| Sample 1-4 | 120 | 1 | 0 | 120 | — | 2.5 | 2.5 | 2.5 |
| Sample 1-5 | 120 | 2.5 | 0 | 48 | — | 3 | 3.5 | 2 |
| Sample 1-6 | 120 | 5 | 0 | 24 | — | 2 | 5 | 1 |
| Sample 1-7 | 120 | 20 | 0 | 6 | — | 1 | 5 | 1 |
| Sample 1-8 | 10 | 0.2 | 0 | 50 | — | 2 | 1 | 2 |
| Sample 1-9 | 30 | 0.6 | 0 | 50 | — | 2 | 2 | 2 |
| Sample 1-10 | 2 | 0.1 | 0 | 20 | — | 1 | 1 | 1.5 |
| Sample 1-11 | 2 | 0.2 | 0 | 10 | — | 1 | 1 | 1.5 |
| Sample 1-12 | 2 | 0.4 | 0 | 5 | — | 1 | 1.5 | 1.5 |
| Sample 1-13 | 300 | 0.5 | 0 | 600 | — | 4.5 | 1 | 4 |
| Sample 1-14 | 300 | 1 | 0 | 300 | — | 4.5 | 1 | 4 |
| Sample 1-15 | 300 | 2 | 0 | 150 | — | 3.5 | 2 | 3.5 |
| Sample 1-16 | 300 | 50 | 0 | 6 | — | 1.5 | 5 | 1 |
| Sample 1-17 | 120 | 1 | 1.5 | 120 | 1.5 | 2.5 | 2.5 | 2.5 |
| Sample 1-18 | 120 | 1 | 5 | 120 | 5 | 2.5 | 2.5 | 2.5 |
| Sample 1-19 | 120 | 3 | 30 | 120 | 30 | 3.5 | 2 | 3.5 |
| Sample 1-20 | 120 | 1 | 50 | 120 | 50 | 3.5 | 1.5 | 3.5 |

As shown above, it was demonstrated that when samples contained linalool and 1-penten-3-one, and had a weight ratio of linalool content to 1-penten-3-one content (linalool/1-penten-3-one) within the specified range, the samples were perceived to have excellent floral aroma.

3. Study on the Ratio of Aroma Components (2)

A study was made on the influence of a weight ratio of linalool content to 1-penten-3-one content (linalool/1-penten-3-one) using the powder composition prepared according to the procedure described above in 1.

As a result of the concentration measurement performed according to the procedure described above in 1, the linalool and 1-penten-3-one concentrations in the powder composition per se as used in this study were found to be 12000 ppb and 24 ppb, respectively. 1 g of this powder composition was added to 100 mL of water to prepare a solution of the powder composition. To the solution, a 1-penten-3-one reference standard was added to give different final concentrations as indicated in the table given below, whereby different concentrations of samples were prepared. As mentioned above in 1, since the 1-penten-3-one concentration in the reference standard was unknown, concentration measurement of the reference standard had been done by gas chromatography in advance. To be specific, the 1-penten-3-one reference standard was diluted with 50 to 5000 times its weight of pure water to adjust its concentration, as appropriate, to lie within the range of the calibration curve, whereby a sample for concentration measurement was prepared. The gas chromatographic analysis was done by following the same procedure as described above.

The different samples prepared using the reference standard were subjected to sensory evaluation by two panelists who were well trained in aroma evaluation, according to the evaluation procedure and rating scales described above in 2. The results are shown in the table given below.

TABLE 2

| | Linalool [ppb] | 1-Penten-3-one [ppb] | Linalool/1-penten-3-one | Rating | | |
|---|---|---|---|---|---|---|
| | | | | Floral aroma | Gassy odor/steamy sensation | Favorableness |
| Sample 2-1 | 120 | 0.24 | 500 | 3 | 1 | 3 |
| Sample 2-2 | 120 | 0.3 | 400 | 3 | 1.5 | 3 |
| Sample 2-3 | 120 | 0.5 | 240 | 3 | 1.5 | 3 |
| Sample 2-4 | 120 | 1 | 120 | 2.5 | 1.5 | 2 |
| Sample 2-5 | 120 | 5 | 24 | 1.5 | 4 | 1 |
| Sample 2-6 | 120 | 10 | 12 | 1 | 4 | 1 |
| Sample 2-7 | 120 | 20 | 6 | 1 | 5 | 1 |

As shown above, it was demonstrated that when samples contained linalool and 1-penten-3-one, and had a weight ratio of linalool content to 1-penten-3-one content (linalool/1-penten-3-one) within the specified range, the samples were perceived to have excellent floral aroma.

The invention claimed is:

1. A solid composition comprising linalool and 1-penten-3-one, and having a weight ratio of linalool content to 1-penten-3-one content of not less than 48.

2. The composition according to claim 1, wherein the composition is a powder composition.

3. The composition according to claim 1, further comprising two or more types of dextrins.

4. The composition according to claim 3, further comprising a linear dextrin and a cyclic dextrin.

5. The composition according to claim 1, further comprising geraniol.

6. The composition according to claim 1, further comprising at least one aroma component selected from the group consisting of α-ionone, 2-methylbutanal, 2,4-heptadienal, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol and indole.

7. The composition according to claim 1, further comprising a tea leaf extract.

8. The composition according to claim 7, wherein the tea leaf extract is a Sencha tea leaf extract.

9. A beverage or food comprising the composition according to claim 1.

10. The beverage or food according to claim 9, wherein the beverage or food is a beverage.

11. The beverage or food according to claim 10, wherein the beverage or food is a tea beverage.

* * * * *